United States Patent [19]
Dixon

[11] Patent Number: 5,987,548
[45] Date of Patent: Nov. 16, 1999

[54] METHOD AND APPARATUS FOR DETERMINING SYSTEM IDENTIFICATION NUMBER SYSTEM USING SYSTEM DATA BUS AND PULL-UP RESISTORS IN COMBINATION WITH A SENSING CIRCUITRY

[75] Inventor: Robert Christopher Dixon, Austin, Tex.

[73] Assignee: International Business Machines Corporation, Armonk, N.Y.

[21] Appl. No.: 08/888,800

[22] Filed: Jul. 7, 1997

[51] Int. Cl.⁶ .................................................. G06F 13/00
[52] U.S. Cl. ......................... 710/104; 710/102; 710/19; 710/8
[58] Field of Search ................... 395/284–288, 395/828–839; 710/101–102

[56] References Cited

U.S. PATENT DOCUMENTS

| | | | |
|---|---|---|---|
| 4,268,911 | 5/1981 | Bell | 365/104 |
| 4,458,357 | 7/1984 | Weymouth et al. | 377/2 |
| 4,578,773 | 3/1986 | Desai et al. | 364/900 |
| 4,727,475 | 2/1988 | Kiremidjian | 364/200 |
| 4,825,404 | 4/1989 | Theus | 364/900 |
| 5,274,781 | 12/1993 | Gibart | 395/284 |
| 5,408,611 | 4/1995 | Kim | 395/275 |
| 5,434,982 | 7/1995 | Calzi | 395/325 |
| 5,448,741 | 9/1995 | Oka | 395/700 |
| 5,491,804 | 2/1996 | Heath et al. | 395/275 |
| 5,491,830 | 2/1996 | Ferri | 395/829 |
| 5,517,646 | 5/1996 | Piccirillo et al. | 395/700 |
| 5,594,873 | 1/1997 | Garrett | 710/101 |
| 5,594,874 | 1/1997 | Narayanan et al. | 395/284 |
| 5,598,577 | 1/1997 | Overfield | 395/830 |
| 5,608,877 | 3/1997 | Sung et al. | 395/284 |
| 5,619,724 | 4/1997 | Moore | 395/829 |
| 5,666,557 | 9/1997 | Cassidy et al. | 395/828 |
| 5,740,378 | 4/1998 | Rehl et al. | 710/102 |
| 5,758,102 | 5/1998 | Carey et al. | 710/102 |
| 5,787,306 | 7/1998 | Michael | 395/829 |

*Primary Examiner*—Ayaz R. Sheikh
*Assistant Examiner*—Raymond N Phan
*Attorney, Agent, or Firm*—Robert V. Wilder; Volel Emile

[57] ABSTRACT

A method and implementing system are provided for determining and retaining an identification number relevant to an electronic system component and/or component configuration. In an exemplary embodiment, existing pull-up resistors within a computer system are connected in a manner to enable associated circuitry to determine a pre-assigned identification number for the computer system. The identification number is stored in an identification number register and accessible for providing the identification number in response to a requests from other devices within the system.

16 Claims, 3 Drawing Sheets

METHOD AND APPARATUS FOR DETERMINING SYSTEM IDENTIFICATION NUMBER SYSTEM USING SYSTEM DATA BUS AND PULL-UP RESISTORS IN COMBINATION WITH A SENSING CIRCUITRY

FIELD OF THE INVENTION

The present invention relates generally to electronic systems and more particularly to an enhanced methodology for providing identification numbers for electronic equipment.

BACKGROUND OF THE INVENTION

As electronic systems including computers, cellular telephones and networked computer systems proliferate, and become integrated into more and more information processing systems vital to businesses and industries, there is a growing need to have the ability to identify the type and/or version of electronic equipment being used. For example, computer systems, especially in networked systems, need to be able to identify the version or revision of a processor or processing system to the computer CPU or the server CPU. This identification capability is essential in order to identify to a CPU the type and level of the system to initialization software, so that the CPU is able to determine what software and software version, for example, may be used or downloaded by the individual computer station or network terminal. Similarly, the identification number is useful, and in some cases essential, in all types of electronic equipment, including, for example, cellular phones, to enable system processing circuitry to configure the system or other units in a system, to work with the specific version of an electronic device being used. That information, and additional information as well, is provided, typically in some coded form, by an identification number or ID number of an electronic device.

In many systems, for example, when the system is started up or before a new program or operation is undertaken by a computer, the CPU or other device, will request a read out of the system ID number from a system ID number buffer device. Typically, the system ID number is pre-set at the factory in a buffer circuit and may be read out with a proper device select signal. The ID number is representative of the specific system including several core components and when a system is updated a new ID number is entered into the ID number buffer circuit, which is generally located on a separate chip on the mother board of the system.

That arrangement is generally undesirable since it takes up valuable space on the motherboard and requires additional buffer circuitry which comprises a dedicated buffer used solely for the function of storing and providing the system ID number when requested. Alternatively, integration of the ID number buffer into other circuitry requires dedicated ID programming inputs. It would therefore be desired to be able to provide the ID number function using fewer circuit components and requiring less space on a system chip or motherboard.

Accordingly, there is a need for an enhanced method and apparatus which is effective to determine and store a system or other identification number representative of "version" or other predetermined information concerning an installed electronic system, while, at the same time, minimizing space and component requirements for performing the identification function.

SUMMARY OF THE INVENTION

A method and apparatus is provided for determining and retaining an identification number relevant to an electronic system component and/or component configuration. In an exemplary embodiment, existing pull-up resistors within a computer system are connected in a manner to enable associated circuitry to determine a pre-assigned identification number for the computer system. The identification number is stored in an identification number register and accessible for providing the identification number in response to a requests from other devices within the system.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
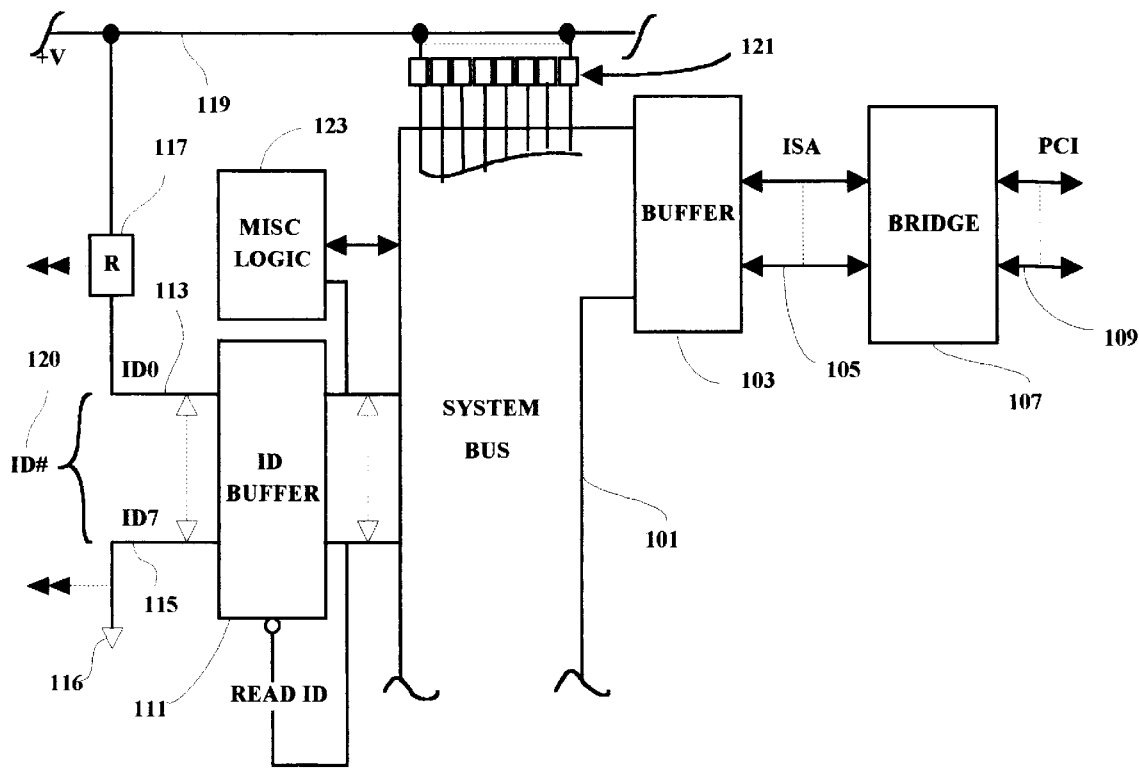
FIG. 1 is a simplified schematic diagram of a prior art system for providing a system identification number.

With reference to the Figures, the various methods discussed herein may be implemented within a typical computer system or workstation. An exemplary hardware configuration of a workstation or computer which may be used in conjunction with the present invention is illustrated along with a functional flow of the exemplary implementation. In addition to the hard-wired exemplary embodiment herein disclosed, it is also noted that magnetic media or other media containing programming indicia may also be read into the system and/or executed from a memory device or from a storage unit, as is well known in the art, to effect the accomplishment of the ID number function methodology as herein disclosed. The ID number methodology may also be implemented partially in software and partially in hardware with the software residing in system storage or loaded into memory or separate memory. Since the workstation or computer system within which the present invention is implemented is, for the most part, generally known in the art and composed of electronic components and circuits which are also generally known to those skilled in the art, circuit details beyond those shown in the drawings, will not be explained to any greater extent than that considered necessary as illustrated, for the understanding and appreciation of the underlying concepts of the present invention and in order not to obfuscate or distract from the teachings of the present invention.

In FIG. 1, an exemplary computer system includes a system bus 101 which is connected through a buffer or bridge circuit 103 to an ISA bus 105. The ISA bus 105 is further connected through another bridge circuit 107 to a PCI bus 109 within the exemplary system. Also connected to the system bus 101 is an identification number or "ID" buffer 111. The ID buffer 111 is typically a dedicated buffer on the system motherboard used solely for the purpose of storing an identification number representative of the specific version of the system or its configuration. The ID buffer 111 receives inputs on ID lines ID0 113 through ID7 115. The buffer input lines are connected at the factory to either a ground level potential 116 such as line 115, or to a logic "1" level potential such as line 113 which is connected through a resistor 117 to a "VDD" bus 119. The logic "1" level in the present example is "VDD" and may be either 5 volts or 3 volts, although any other consistent voltage level and/or voltage convention may also be implemented. The system ID number 120 is typically pre-assigned at the factory and is defined by the 8 bit number defined by the connections of ID lines ID0 113 through ID7 115.

The system also generally includes so-called "pull-up" resistors 121 and a miscellaneous logic chip 123 connected to the system bus 101. The pull-up resistors are connected to respective data lines of the system bus and are typically included in most systems in order to "pull-up" the data lines to a "normal" potential or a "1" logic level in the absence of the application of other data signals. In the present example there are eight data lines and accordingly eight corresponding pull-up resistors each connected to the VDD bus 119. It is noted that in the FIG. 1 prior art example, the pull-up resistors 121 and the ID buffer 111 serve totally different functions and require dedicated circuitry to perform such functions. In accordance with the present invention, the pull-up resistors are used to serve their normal pull-up function and are also used to implement an ID number system thereby eliminating the need for the dedicated ID buffer and associated connections which have heretofore been required.

Figure 2:
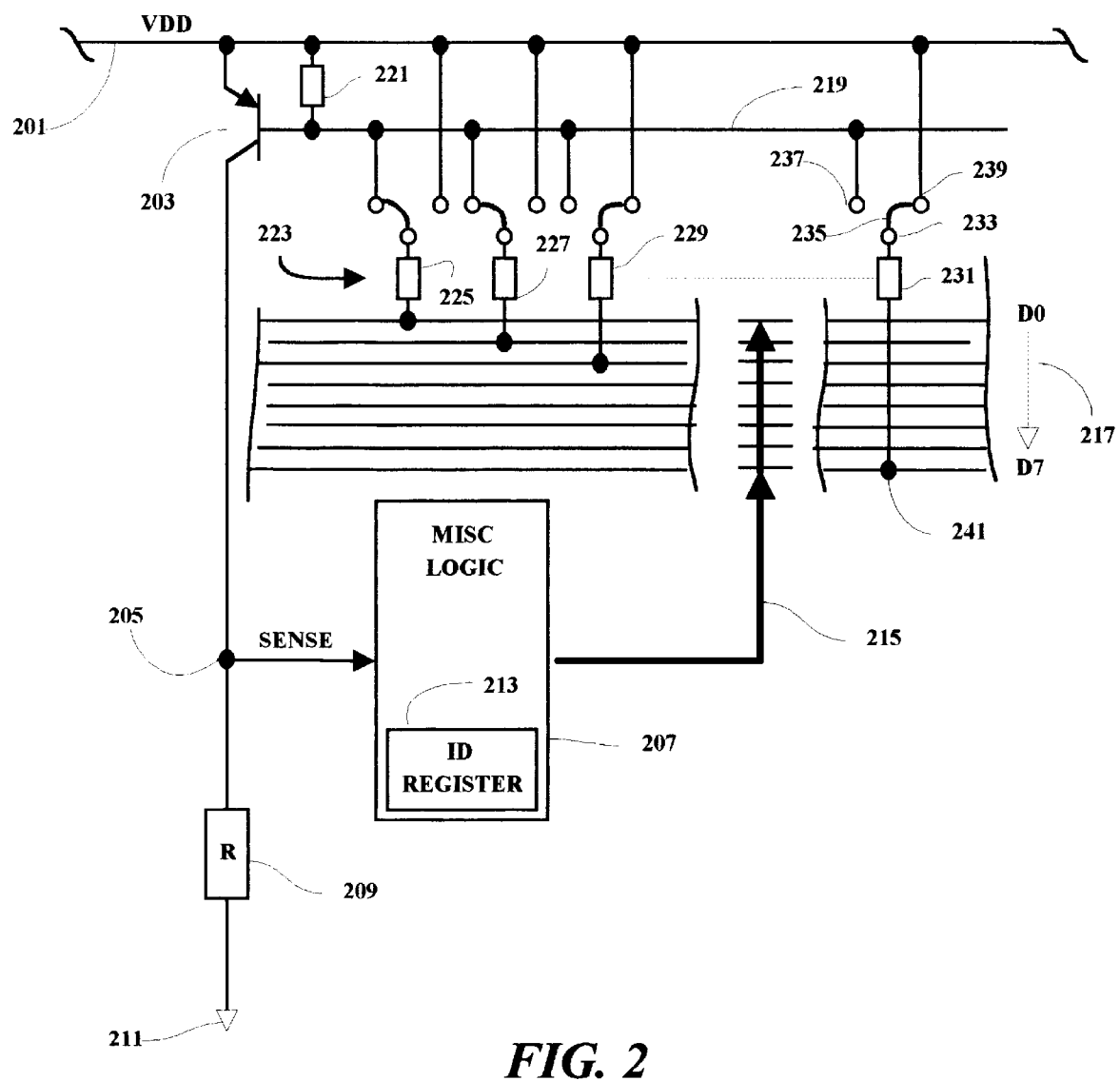
FIG. 2 is a simplified schematic diagram illustrating one embodiment of the identification number system of the present invention.

In FIG. 2, an exemplary embodiment of the present invention includes a VDD bus 201 which is connected through a switching device or transistor 203 to a "sense" node 205. The sense node 205 is applied to a miscellaneous logic circuit 207 and also through a "sense" resistor 209 to ground 211. The logic circuit 207 includes an ID register 213 which is arranged to selectively store and have read out, a system ID number or other relevant system number. The logic circuit 207 is arranged to selectively request and assume ownership of the data bus and selectively apply digital signals, i.e. high or "1" level and low or "0" level potentials, through signal lines 215 to data bus lines D0 through D7 217. As hereinbefore noted, a high or "1" level potential, i.e. VDD, is five volts (or 3 volts), and a low or "0" level potential is zero volts.

The base or control terminal of the transistor 203 is connected to a control bus 219. A biasing resistor 221 connects the VDD bus 201 to the control bus 219. Data line pull-up resistors 223 are selectively connected to either the VDD bus 201 or the control bus 219, and those selective connections are typically made by the system manufacturer and representative of the specific version or ID number of the system. For example, the pull-up resistors 223 include resistors 225, 227, 229 and 231 as illustrated. There is one pull-up resistor connected to each data line D0–D7 although not all of the pull-up resistors are shown in order to simplify the illustration. In the present example, pull-up resistor 231 is connected to a pull-up resistor terminal 233. The control bus 219 is shown connected to control bus terminal 237 and the VDD bus 201 is connected to a VDD terminal 239. In general, as will be hereinafter explained in more detail, a connection of a pull-up resistor terminal to the control bus 219 is representative of a logic "1" at the ID number bit position and a connection of a pull-up resistor terminal to the VDD bus is representative of a logic "0" at the ID number bit position of the corresponding pull-up resistor.

A connector device or jumper, such as connector 235, is installed (typically by the system manufacturer) to connect each pull-up resistor terminal, such as terminal 233, to either the control bus terminal 237 or the VDD bus terminal 239 as shown. In general, as hereinbefore noted, the ID number will be defined by the manner in which the connectors, such as connector 235, are arranged, i.e. whether the respective pull-up terminals are connected to either the control bus 219 or the VDD bus 201. That sequence of connections will define a series of "1"s and "0"s that will make up an eight bit ID number in the present example. For example, resistor 225 is shown connected to the control bus 219 and that connection represents a logic one at the least significant bit position of the eight bit digital ID number. Similarly, resistor 231 is connected to the VDD bus 201 and therefore is representative of a logic zero at the least significant bit position of the eight bit digital ID number. As shown, in the present example, there are eight data lines D0–D7 and eight corresponding pull-up resistors, with each resistor being connected to a corresponding data line. It is understood that the disclosed ID number system would work equally well in systems which have fewer than or greater than eight data lines or pull-up resistors. It is also possible to implement the connections between the pull-up resistor terminals and the VDD bus 201 or the control bus 219 by means of selector switches which may be selectively moved between the two different possible positions for each of the pull-up resistor circuits. That implementation would allow greater flexibility in changing ID or other system relevant numbers, but would not be as reliable from a system integrity standpoint.

Figure 3:
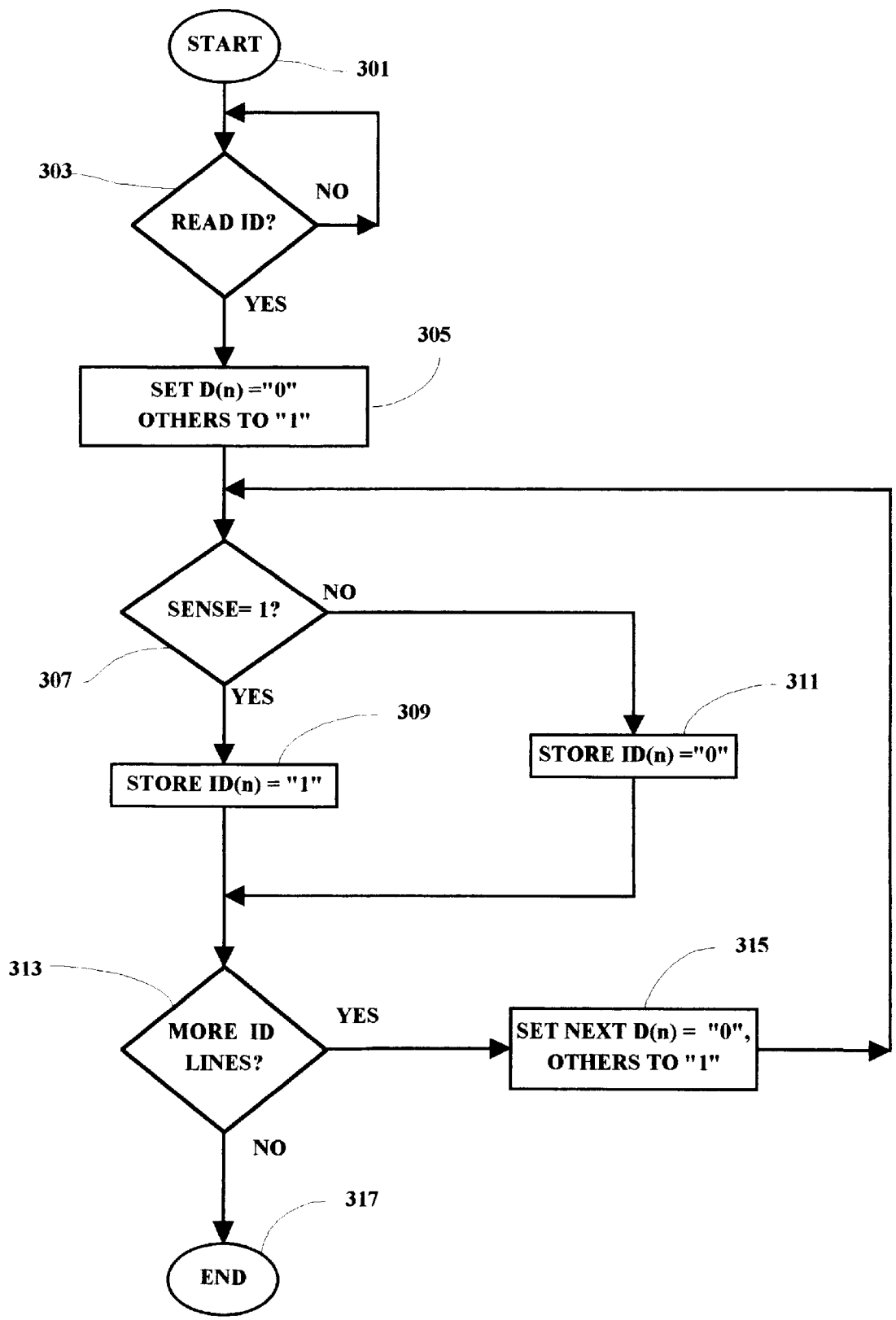
FIG. 3 is a flowchart illustrating the flow methodology implemented in accordance with the disclosed embodiment.

In operation, it is noted that the value of the resistor 221 is selected to be sufficiently small relative to the value of the pull-up resistors 223 such that the potentials at lines 201 and 219 are very close, so that the pull-up function is served by connection of the data lines to either bus, but there is a sufficient potential difference across biasing resistor 221 when a circuit from VDD through resistor 221 to ground is made, so that the switching device or transistor 203 turns on. With reference to FIG. 2 and FIG. 3, when a system CPU or other system device calls for the ID number of the system, the present process is started 301, and when it is determined that a request has been made to read the ID number 303, the logic circuit 207 sets the D0 data line to "0" and sets the other data lines D1–D7 to a logic "1" level 305. At that point, data line D0 is the only data line that is grounded i.e. at a "0" logic level. At that time, the circuit is making a determination of what logic level is contained in the first bit position of the eight bit digital ID number by grounding the first pull-up resistor 225 through the connected data line D0. When any data line such as D0 is grounded through the application of a logic "0", if the corresponding pull-up resistor such as resistor 225 is connected to the control bus 219, a circuit is made from VDD through the biasing resistor 221 and the pull-up resistor such as resistor 225 to ground. The potential drop across biasing resistor 221 will cause transistor 203 to conduct thereby applying VDD across the sensing resistor 209 to ground 211. When the SENSE signal at node 205 goes high, it is detected 307 as a logic "1" being present in the LSB position of the ID number and a logic "1" is stored 309 in the ID register 213 as the LSB of the ID number. If the SENSE signal is not at a logic "1" level, it is interpreted as a logic "0" and a logic "0" is stored 309 in the ID register 213 as the first or LSB of the ID number. Thereafter, a determination is made 313 as to whether there are any more ID lines to be probed or tested for logic level. If there are more lines to be tested, the next data line is set to "0" and all of the other lines are set to logic "1" 315. At that time the methodology continues to "sense" for a logic level 307. When the final pull-up resistor 231 position is tested, i.e. when D7 line is set or connected to "0" or ground, since the connector 235 is coupled to the VDD bus 201, a circuit is made around biasing resistor 221 and transistor 203 does not conduct. In that circumstance, the potential at node 205 is not VDD and the logic circuit interprets that as a logic "0" at the ID number MSB position corresponding to pull-up resistor 231. Accordingly, a logic "0" is placed in the MSB position of the ID register 213. The process repeats for each data line until each bit position has been determined to be a logic "1" or a logic "0", and the resulting ID number has been determined and stored in the ID register 213 and available for subsequent accessing and read out. When there are no more lines to be tested, the process ends 317.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other integrated circuit or chip. The methodology may also be implemented solely in program code stored in magnetic, optical or other form on a disk or diskette (portable or fixed), or other memory device, from which it may be executed to accomplish the benefits as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for implementing an electronically generated identification number for an electronic system having a data bus, said identification number being represented by respective positions of a series of connectors within in a terminal arrangement, said terminal arrangement being positioned to connect said data bus through pull-up resistors selectively to either pull-up potential bus or a control bus, said connectors being capable of being in either of a first position connected to said pull-up potential bus, or a second position connected to said control bus, wherein said first position is representative of a first logic level and said second position being representative of a second logic level, said identification number comprising a sequential combination of logic levels at sequential bit positions of said identification number corresponding to said respective positions of said series of connectors, said method comprising:

applying an identification read-out signal to said data bus;

selectively determining positions each of said connectors by sensing signals caused to be generated by said read-out signal; and combining logic levels represented by said connector positions into said identification number.

2. The method as set forth in claim 1 and further including:

storing said identification number in a data register device.

3. The method as set forth in claim 1 wherein said selectively determining further includes:

sequentially connecting each of said connectors into a logic detecting circuit, said logic detecting circuit being selectively operable for generating a predetermined logic level signal when said connector is in said first position; and sensing said predetermined logic level signal when said predetermined logic level signal is generated by said detecting circuit.

4. The method as set forth in claim 3 wherein said combining further includes:

setting sequential bit positions of said identification number in sequential bit positions of a data register in response to said sensing of said predetermined logic level.

5. The method as set forth in claim 3 wherein said sequentially connecting is accomplished by:

connecting said logic detecting circuit to signal lines of a system bus; and applying a plurality of predetermined bit sequences of logic level signals to said signal lines wherein said sequential connections are made in correspondence to said plurality of predetermined bit sequences.

6. The method as set forth in claim 4 wherein said sequentially connecting is accomplished by:

connecting said logic detecting circuit to signal lines of a system bus; and applying a plurality of predetermined bit sequences of logic level signals to said signal lines wherein said sequential connections are made in correspondence to said plurality of predetermined bit sequences.

7. An identification number processing system comprising:

a system bus including a plurality of data lines;

a plurality of pull-up resistors connected to said data lines of said system bus;

a terminal arrangement connected between said pull-up resistors and a pull-up bus, said terminal arrangement including a plurality of selective connections therein, each of said selective connections being representative of a single bit logic level of a multi-bit identification number;

a sensing circuit coupled to said terminal arrangement, said sensing circuit being selectively operable for sensing said logic level of said single bit logic levels of said multi-bit identification number; and switching circuitry arranged for selectively connecting sequential ones of said plurality of selective connections of said terminal arrangement to said plurality of data lines of said system bus, whereby said identification number is selectively determined by combining said single bit logic levels as determined by said sensing circuit in a bit by bit manner as said switching circuitry connects sequential ones of said plurality of selective connections of said terminal arrangement to said plurality of data lines of said system bus.

8. The system as set forth in claim 7 and further including a register device, said register device being coupled to said sensing circuit, said register device being arranged for storing said logic levels of said single bits of said identification number as sensed by said sensing circuit.

9. The system as set forth in claim 8 wherein said selective connections of said terminal arrangement are selectively connected by said switching circuitry to said data lines of said system bus.

10. The system as set forth in claim 9 wherein said register device is responsive to a request from a requesting device in said system for providing said identification number to said requesting device.

11. The system as set forth in claim 10 wherein said sensing circuitry includes:

a switching device connected to said terminal arrangement, said switching device being selectively actuated in response to a sensed predetermined connection condition within said terminal arrangement.

12. The system as set forth in claim 11 wherein said switching device is a transistor.

13. A storage medium including machine readable indicia, said storage medium being selectively coupled to a reading device, said reading device being selectively coupled to processing circuitry within a processing system, said reading device being selectively operable to read said machine readable indicia and provide program signals representative thereof, said program signals being effective to cause said processing circuitry to detect an identification number for an electronic system having a data bus, said identification number being represented by respective positions of a series of connectors within in a terminal arrangement, said connectors being capable of being in either of first or second positions wherein said first position is representative of a first logic level and said second position being representative of a second logic level, said identification number comprising a sequential combination of logic levels at sequential bit positions of said identification number corresponding to said respective positions of said series of connectors, said processing circuitry being responsive to said program signals for:

applying an identification read-out signal to said data bus;

selectively determining positions each of said connectors by sensing signals caused to be generated by said read-out signal; and combining logic levels represented by said connector positions into said identification number.

14. The storage medium as set forth in claim 13 wherein said program signals are further effective for selectively storing said identification number in a data register device.

15. The storage medium as set forth in claim 14 wherein said program signals are further effective to cause said processing circuitry to read out said identification number from said data register device.

16. An electronic system including:

a bus arrangement having a plurality of data bus lines;

pull-up resistor circuitry connected to said data bus lines; and identification number circuitry connected to said bus arrangement, said identification number circuitry being selectively operable for applying a predetermined sequence of read signals to selected ones of said data bus lines, said identification number circuitry further including sensing circuitry responsive to said read signals for providing an identification signal representative of an identification number associated with the electronic system.

* * * * *